C. E. MEAD.
DRIVING MECHANISM FOR ROTARY VALVES.
APPLICATION FILED MAR. 7, 1912.

1,130,753.

Patented Mar. 9, 1915.

Witnesses
G. Howard Walmsley
Harriet L. Hammaker

Inventor
Cyrus E. Mead,
By Tomlinson & Reed
Attorneys

UNITED STATES PATENT OFFICE.

CYRUS E. MEAD, OF DAYTON, OHIO, ASSIGNOR TO THE MEAD ENGINE COMPANY, OF DAYTON, OHIO, A CORPORATION OF OHIO.

DRIVING MECHANISM FOR ROTARY VALVES.

1,130,753.  Specification of Letters Patent.  Patented Mar. 9, 1915.

Application filed March 7, 1912. Serial No. 682,313.

*To all whom it may concern:*

Be it known that I, CYRUS E. MEAD, a citizen of the United States, residing at Dayton, in the county of Montgomery and State of Ohio, have invented certain new and useful Improvements in Driving Mechanism for Rotary Valves, of which the following is a specification, reference being had therein to the accompanying drawing.

This invention relates to driving mechanism for rotary valves, and the object of the invention is to provide a drive for a rotary valve which will permit of the slowing down or stopping of the rotation of the valve without injury to the driving mechanism or the parts connected therewith.

It is also an object of the invention to provide such a connection which will permit one valve to slow down or stop without interfering with the movement of the other valve and without destroying the relative adjustment of the two valves.

Figure 1:
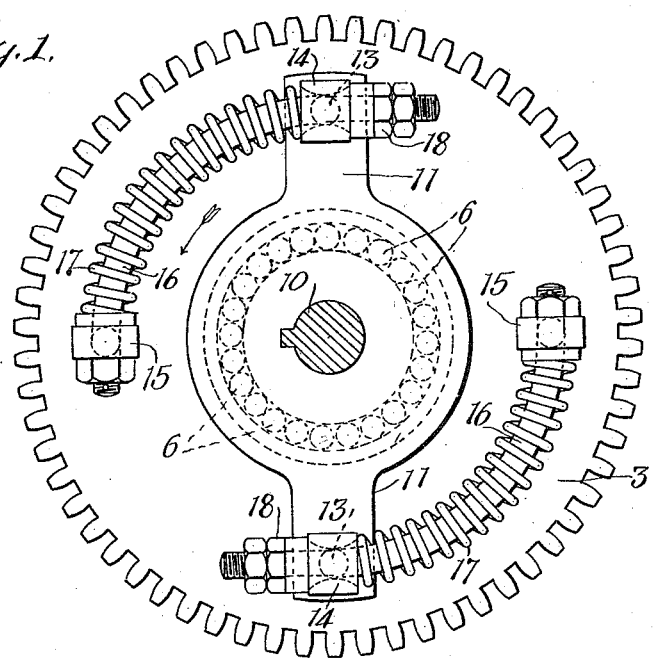
Figure 2:
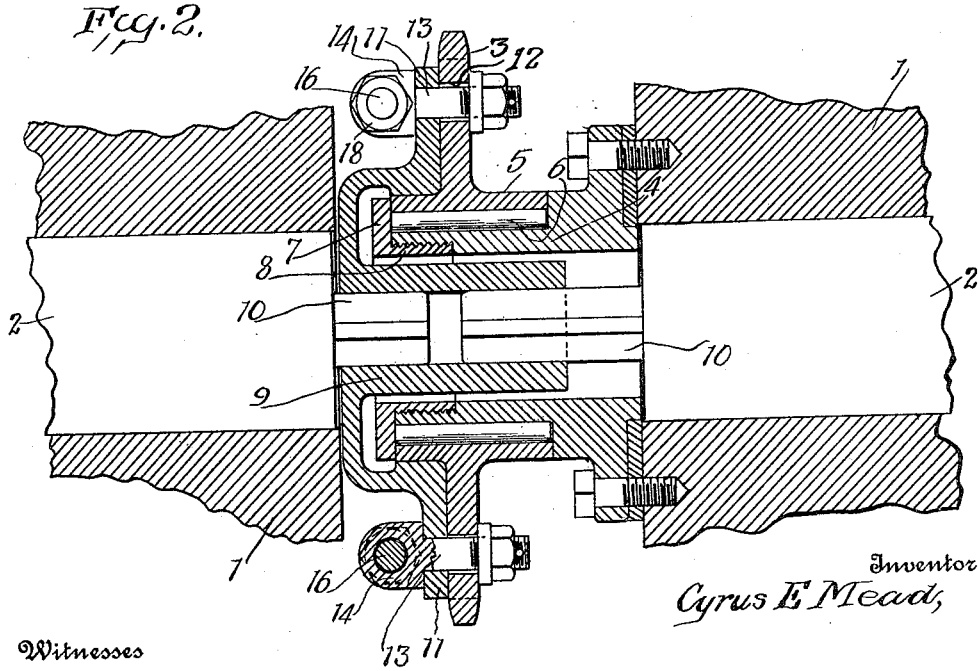

In the accompanying drawings, Figure 1 is an elevation of a driving mechanism embodying my invention; and Fig. 2 is a section taken vertically through Fig. 1.

In these drawings I have illustrated one embodiment of my invention and have shown the same as applied to a driving mechanism similar to that shown and described in the application for patent filed by me Jan'y. 22, 1912, Serial Number 672,605, but it will be understood that the invention is not to be limited to this particular type of driving mechanism. This driving mechanism is shown as applied to one of the valves of a rotary valve engine, portions of which are indicated by the reference numeral 1. The valve, which is indicated at 2, is formed in two parts and the driving mechanism is arranged between the two parts of the valve. Any suitable driving member may be employed for imparting rotary movement to the valves. In the present instance I have employed a sprocket wheel 3 for this purpose. This sprocket wheel may be rotated from any suitable source of power but is preferably driven either directly or indirectly from the crank shaft of the engine. The driving member is preferably mounted independently of the valve so as to relieve the valve of all thrust and permit the same to have movement relatively to the driving member. To this end a hollow stud 4 is mounted on the engine and the driving member 3 is provided with a hub 5 which is rotatably mounted on the hollow stud 4. In the present instance antifriction rollers 6 are interposed between the hub and the stud, and the hub and rollers are held against longitudinal movement by means of a flange 7 having a screw-threaded boss 8 which enters the hollow stud 4. Extending into the hollow stud 4 and free to rotate therein is a connecting member, such as a sleeve 9, which is connected with the rotary member and the driving member. The cross sectional shape of the interior of the sleeve 9 is non-circular and the two parts of the valve are each provided with a stem 10 of a cross sectional shape similar to that of the hollow stud, thus enabling the valve sections to have longitudinal movement relatively to the connecting member but causing the same to rotate in unison with the connecting member. The connection between the connecting member or sleeve 9 and the driving member 3 is an adjustable one to permit of the adjustment of the valve relatively to the driving member, and, as here shown, the sleeve has two oppositely extending apertured arms 11 and the driving member has curved slots 12 arranged adjacent to the apertures in the respective arms. Bolts 13 extend through the apertured arms 11 and through the slots 12 in the driving member, and, by shifting these bolts the points of connection of the arms to the driving member may be varied and the desired adjustment of the valve secured.

So much of the apparatus as has thus far been described is substantially similar to that shown and described in the above mentioned application. The present invention consists in making the connection between the sleeve 9 and the driving member a yielding one, whereby any interference with the rotation of the valve will not result in the injury of the driving mechanism or any of the parts connected therewith. To accomplish this I have provided the bolts 13 with apertured heads 14. Mounted on the driving member at points removed from the slots and on a radius substantially the same as the radius of the slots are apertured lugs 15 having mounted therein curved rods 16, which rods extend through the apertured heads of the respective bolts 13. A spring 17 confined between the lugs 15 and the heads of the bolts 13 tends to move the bolts and, consequently, the arms 11 of the sleeve 9, toward those ends of the respective slots opposite the fixed lug 15. This movement of the arms is limited by means of nuts 18 secured onto the ends of the rods and in this manner the sleeve is adjustable relatively to the driving member and an adjustment of the valve may be secured. The tension of the spring 17 is sufficient to hold the sleeve 9 in a fixed relation to the driving member during the ordinary operation of the valve, thus preserving the relative adjustment of the two valves and insuring the proper timing thereof. If any unusual resistance should be offered to the rotation of the valve, as, for example, by a small piece of carbon becoming lodged between the edges of the ports in the valve and in the valve chamber, the checking of the movement of the valve resulting from this resistance will cause the springs 17 to be compressed without interfering with the rotation of the driving member. The slowing down or stopping of the valve will, however, throw the same out of time and result in the stopping of the engine due to the fact that the valves are not properly timed. The adjustment of the valve is not, however, interfered with and the instant the obstruction or resistance is removed the valve will resume its normal position and in this position it will be properly timed with relation to the other valve. Often the rotation of the valve is not entirely checked and the resistance is but of a momentary character. In such case the timing of the valves will be automatically adjusted as soon as the resistance has been removed and the valve is free to rotate in a normal manner. Whether the checking of the valve is merely momentary or the engine is brought to an entire stop the resiliency of the connection between the valve and the driving member will prevent injury to the driving mechanism.

While I have shown and described one embodiment of the invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. The combination, with a rotary valve having a stem, of a driving member having a curved slot therein mounted independently of said valve and adapted to rotate about an axis substantially coincident with the axis of said valve, of a sleeve to receive said valve stem and to rotate in unison therewith, an arm carried by said sleeve, a bolt extending through said arm and through the slot in said driving member, said bolt having an apertured head, a curved rod mounted on said driving member, extending through the apertured head of said bolt and having a stop at a point remote from said apertured head, and a spring confined between the apertured head of said bolt and said stop.

2. The combination, with a rotary valve having a stem, of a driving member having a curved slot therein mounted independently of said valve and adapted to rotate about an axis substantially coincident with the axis of said valve, of a sleeve to receive said valve stem and to rotate in unison therewith, an arm carried by said sleeve, a bolt extending through said arm and through the slot in said driving member, said bolt having an apertured head, a curved rod mounted on said driving member, extending through the apertured head of said bolt and having a stop at a point remote from said apertured head, a spring confined between the apertured head of said bolt and said stop, and adjustable means for limiting the movement of said bolt with relation to said rod.

In testimony whereof, I affix my signature in presence of two witnesses.

CYRUS E. MEAD.

Witnesses:
WILLIAM M. MATTHEWS,
HARRIET L. HAMMAKER.

Copies of this patent may be obtained for five cents each, by addressing the "Commissioner of Patents, Washington, D. C."